United States Patent
Wong

[11] Patent Number: 5,912,396
[45] Date of Patent: Jun. 15, 1999

[54] SYSTEM AND METHOD FOR REMEDIATION OF SELECTED ATMOSPHERIC CONDITIONS

[76] Inventor: Alfred Y. Wong, 1017 Westholme Ave., Los Angeles, Calif. 90024

[21] Appl. No.: 08/999,770

[22] Filed: Jul. 7, 1997

Related U.S. Application Data

[63] Continuation of application No. 08/527,288, Sep. 12, 1995, abandoned, which is a continuation of application No. 08/238,473, May 5, 1994, abandoned.

[51] Int. Cl.⁶ .............................. A62D 3/00; A62B 7/08; B01J 19/08
[52] U.S. Cl. ................... 588/212; 422/121; 422/186.04; 422/186.3; 422/168; 96/62; 96/77
[58] Field of Search .............................. 422/121, 186.04, 422/186.3, 168; 96/62, 77; 588/212, 219

[56] References Cited

U.S. PATENT DOCUMENTS

| | | | |
|---|---|---|---|
| 1,928,963 | 10/1933 | Chaffee | 95/62 X |
| 3,286,467 | 11/1966 | Hunter | 60/202 |
| 3,416,319 | 12/1968 | Rubenstein | 60/202 |
| 3,722,183 | 3/1973 | Gaylord | 96/63 |
| 3,736,727 | 6/1973 | Shriner | 96/17 |
| 3,942,975 | 3/1976 | Drummond et al. | 96/1 X |
| 4,081,677 | 3/1978 | Dawson | 250/282 X |
| 4,364,532 | 12/1982 | Stark | 244/30 |
| 4,671,805 | 6/1987 | Gourdine | 95/62 X |
| 4,818,864 | 4/1989 | Allemann | 250/291 |
| 4,871,515 | 10/1989 | Reichle et al. | 96/68 X |
| 4,954,320 | 9/1990 | Birmingham et al. | 96/68 X |
| 4,956,152 | 9/1990 | Keough et al. | 422/181 |
| 4,997,632 | 3/1991 | Rodewald | 423/240 R |
| 5,005,101 | 4/1991 | Gallagher et al. | 96/54 X |
| 5,126,111 | 6/1992 | Al-Ekabi et al. | 422/186.3 |
| 5,147,429 | 9/1992 | Bartholomew et al. | 55/356 |
| 5,284,556 | 2/1994 | Rich | 204/164 |
| 5,291,734 | 3/1994 | Sohnly | 60/202 |

*Primary Examiner*—Nina Bhat

[57] ABSTRACT

The system includes a platform assembly which includes a plurality of helium airships for support of an emitting electrode to produce a large amount of electrical charges, in the form of electrons, into the surrounding atmosphere. The electrons may be generated by various apparati, including field induced emission and ultraviolet induced emission and ionization. Also provided are a large bank of solar cells to produce the necessary power for the assembly and a propulsion system, either a propeller system or an ion engine. A positive electrode may also be included which collects the undesirable atmospheric elements, such as chlorine atoms, to which negative charges have become attached. Alternatively, the platform could be arranged to include a negatively charged surface at which chlorofluorocarbons, for instance, can dissociate after they come in contact with negative charges. Such an ion-propelled platform in the high troposphere or stratosphere could also be used for regional and/or global telecommunications.

36 Claims, 6 Drawing Sheets

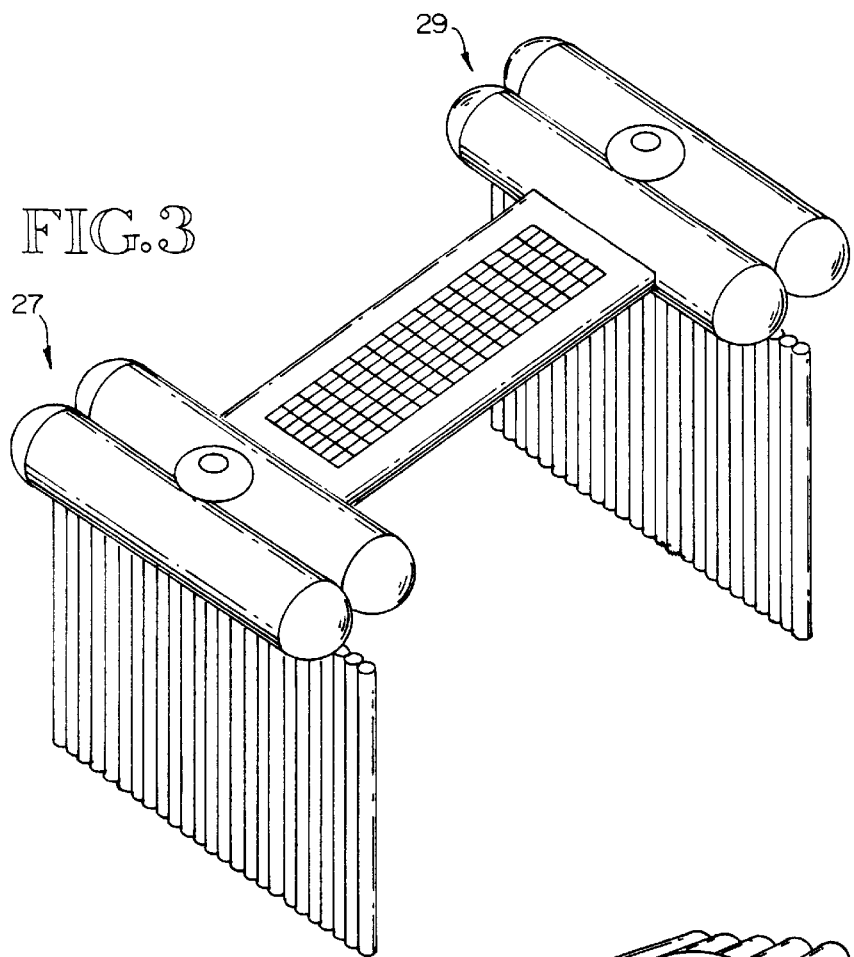
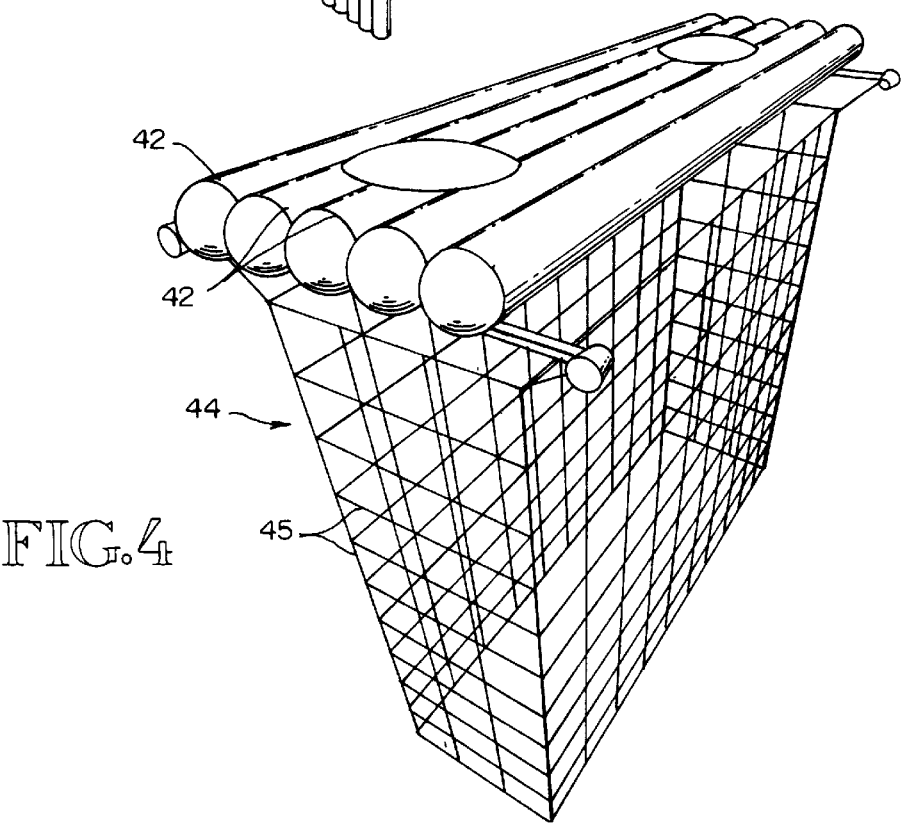

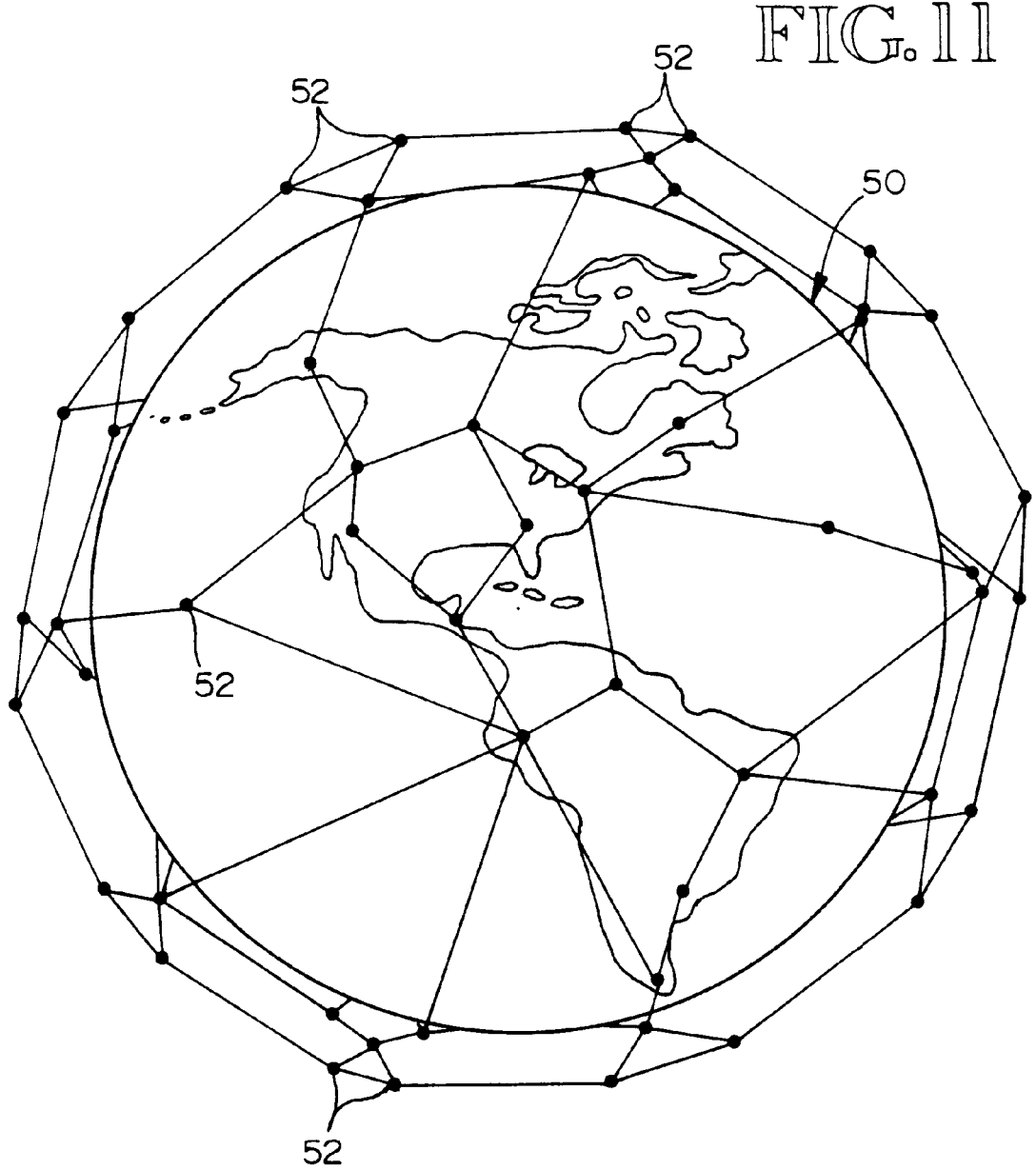

SYSTEM AND METHOD FOR REMEDIATION OF SELECTED ATMOSPHERIC CONDITIONS

This application is a continuation of Ser. No. 08/527,288 filed Sep. 12, 1995 now abandoned which is a continuation of Ser. No. 08/238,473 May 5, 1994 also abandoned.

TECHNICAL FIELD

This invention relates generally to the art of remediating atmospheric pollution and more specifically concerns such a system which is airborne and which includes means for injecting large quantities of electrical charges into the region surrounding the airborne system or which includes a large surface area on which such electrical charges reside. Such an airborne system can also be conveniently used, with appropriate modification, for global communication.

BACKGROUND OF THE INVENTION

Over the past several years in particular, there has been increasing concern about the level of pollution in the atmosphere, as well as attempts of various kinds to remediate various pollutant conditions. In the lower troposphere portion of the atmosphere, 0–2 km above the earth's surface, the primary pollutants are in the form of smog or smog-like particulates, but also include many other harmful chemicals. The smog often is in the form of a dense layer, trapped by a temperature inversion. The smog layer then traps other pollutants, increasing the pollution problem. This condition poses well-known health risks.

One of the most significant current issues in atmospheric pollution concerns the ozone layer, which is located in the stratosphere region of the atmosphere, 20 to 50 km above the earth's surface. The ozone layer is known to be of critical importance to the ecology of the earth. Unfortunately, the ozone layer has already been depleted to a significant extent, to the point where the existence of an ozone "hole" has been verified over the Antarctic region.

It has been discovered that ozone is destroyed by a reaction with chlorine atoms, with one chlorine atom apparently capable of catalytically reacting with and destroying approximately 500,000 ozone molecules. The presence of chlorine in the stratosphere is produced by both natural and anthropogenic sources, among which is the disassociation of chlorofluorocarbons (CFCs) by means of ultraviolet radiation in that region of the atmosphere.

Chlorofluorocarbons are produced on earth as a byproduct of various industrial processes, and then slowly migrate through the troposphere up into the stratospheric region of the atmosphere, where the ozone layer is located. This migration is often quite slow and will typically take many years, even decades, to complete. The disadvantage of this slow migration is that while a decrease in the production of chlorofluorocarbons on earth will eventually result in a decrease in the amount of chlorine in the stratosphere and a corresponding decrease in the destruction of ozone, there remains a substantial amount of CFCs already present in the atmosphere which will continue to migrate over quite a long period of time into the stratosphere, resulting in the continuing depletion of the ozone layer.

With respect to the problem of smog, there have been a number of suggestions for remediating lower troposphere pollutants. One example of such a system is U.S. Pat. No. 5,147,429 to Bartholomew et al. However, this is a complex and expensive mechanical device involving a number of different conventional elements, including scrubbers and filtration machines. Further, such devices typically have a relatively small capacity compared to the extent of lower troposphere pollution and furthermore require a substantial amount of power, both of which are significant disadvantages.

With respect to the ozone layer, certain measures designed to mitigate the depletion of the ozone layer also have been suggested, in addition to the previously noted suggestions of significantly decreasing production of chlorofluorocarbons.

One possibility involves the conversion of chlorine atoms into negative ions so as to reduce their reactivity. A. Y. Wong, R. Wuerker, J. Sabutis, and R. Suchannek, C. D. Hendricks and P. Gottlieb, "Ion Dynamics and Ozone," *Proceedings of the International Workshop on Controlled Active Global Experiments*, held in Varenna, Italy, September 1990. Another possibility concerns the use of chemical hydrocarbons to scavenge the chlorine radical. R. J. Cicerone, S. Elliot and R. P. Turco, *Science* 254, 1191 (1991). However, no suggestions have been made with respect to an actual apparatus or method for actually implementing such theoretical suggestions in the atmosphere.

Hence, there remains a significant need for a large scale means for remediation of the chlorofluorocarbons which result in ozone depletion, as well as a need for a practical, large-scale means for reducing pollution in the lower troposphere.

In addition to the above-noted issues concerning atmospheric remediation, regional and global telecommunication needs present challenging problems which may be assisted by large-scale stratospheric systems similar to those described herein

DISCLOSURE OF THE INVENTION

The present invention is a system and corresponding method for remediation of atmospheric conditions, including the productions, by an emitter electrode, of a large amount of electrical charges, and positioning the producing means by a positioning means in a selected region of space, so as to make the large volume of electrical charges available in a given volume around the producing means, wherein said volume includes an atmospheric condition characterized by the presence of polluting atmospheric elements such that the electrical charges become attached to said atmospheric elements, resulting in the remediation of said atmospheric condition.

Another aspect of the present invention concerns an ion engine for moving assemblies in the stratosphere, where the atmospheric pressure is quite low, including an electrode means, and means for biasing the electrode so as to maintain the electrode at a selected electric potential and for producing a plasma comprising negative and positive ions, wherein the positive ions are attracted to the electrode, imparting a momentum to the electrode and the assembly sufficient to overcome the atmospheric drag in the stratosphere so as to move the assembly in a controlled manner.

BRIEF DESCRIPTION OF THE DRAWINGS

FIG. 3 is an alternative embodiment to the system of FIG. 1.

FIG. 4 is another embodiment of the system of FIG. 1.

FIG. 11 is a schematic view of a stratospheric-based global communication system using large-scale platform structures.

BEST MODE FOR CARRYING OUT THE INVENTION

Figure 1:
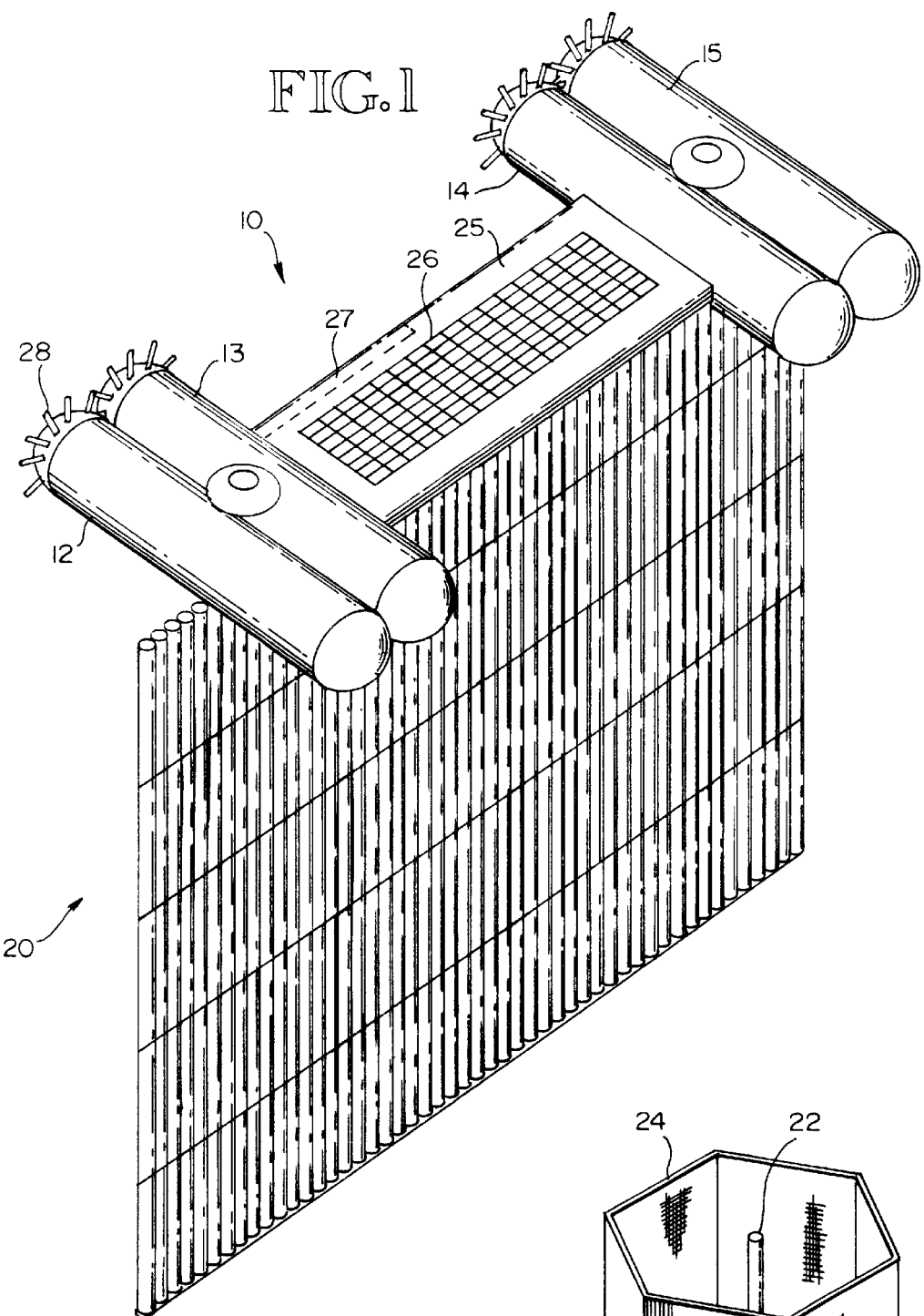
FIG. 1 is a schematic view of one embodiment of the pollution remediation system of the present invention.

FIG. 1 shows an embodiment of the system of the present invention which is suitable for use in the main troposphere (2–12 km above the earth's surface) and the stratosphere (12–50 km above the earth's surface) for remediating the presence of chlorofluorocarbons and/or chlorine atoms in those regions, which otherwise result in the depletion of ozone in the stratosphere. The large scale apparatus of FIG. 1, referred to generally at 10, includes two sets of side-by-side helium airships 12, 13 and 14, 15. Each helium airship is generally conventional, made from lightweight metal framing and fabric and inflated with helium gas. Each airship in the particular embodiment shown is approximately 100 km long and approximately 18 km in diameter. These dimensions may vary considerably. Also, while two sets of two side-by-side helium airships are shown in FIG. 1, a wide variety of airship arrangements can be used. Further, while oblong helium airships are shown, spherical helium balloons or other lighter-than-air airships could also be used.

Depending from the helium airships is an electrode array shown generally at 20 which functions as an inexpensive source of electrons and a means for capturing particulates (including atoms, molecules, aerosol particles and dust particles) to which negative charges have become attached. The array 20 can be of various sizes and configurations, but in this embodiment, the array is 100 meters wide by 100 meters in height, comprising a series of modular tube-like sections, connected edgewise in a two-dimensional array. The area of the array is desirably quite large although it can vary widely in size.

Figure 2:
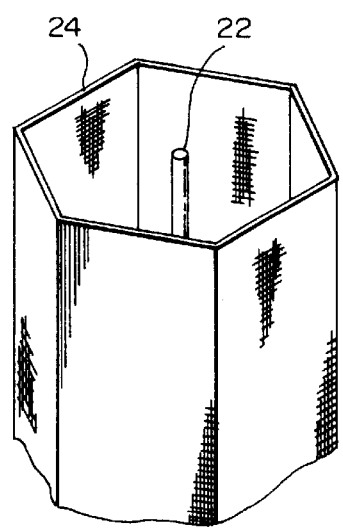
FIG. 2 is a cross-sectional diagram of a portion of the system of FIG. 1.

As shown in FIG. 2, each tube section comprises positive and negative electrodes. The negative electrode is a thin central wire 22 usually made of stainless steel, or other electrically conducting material with a strong tensile strength, with the wire 22 being at a voltage of between 2–4 kv. The positive electrode is a screen 24 which surrounds wire 22 at a distance of approximately 0.5–2 meters, although this distance is not critical.

Power is supplied to the electrode array by a solar energy system 26, which includes a plurality of solar cells, supported on a platform 25 or the like extending between the airships. The solar cells are the primary source of power for this embodiment. An array of solar cells covering 10 meters by 10 meters, for example, will provide up to 50 kilowatts of power, assuming a conversion efficiency of 50 percent. This power level is adequate for the system of FIG. 1. The solar energy system 26 also includes a series of batteries 29 for storage of the electricity generated by the solar cells, for night operation.

A large volume of electrons is generated in this embodiment in the vicinity of the negative electrode wire 22 by a corona discharge. The high electric fields produced by the 2–4 kv potential accelerate the electrons in the field, and an ionization effect is produced. Each accelerated electron produces many secondary electrons, so that the buildup of electrons in the vicinity of the negatively biased electrode occurs quite rapidly. Alternatively, an oscillating electric field can be used to produce the necessary large volume of electrons.

As an alternative to the tubular electrode array configuration described above, a planar electrode configuration may be used. A suitable planar electrode consists of two spaced planar surfaces, each comprised of relatively thin wires. A high voltage imposed between the two planar surfaces will provide the high electric field strength necessary to produce the necessary large volume of electrons. In still another electrode configuration, a screen with sharp protruding points can be used, with the protruding points, each on the order of 10 centimeters high, functioning as emitting electrodes.

In a particular electrode embodiment suitable for use in those regions of the troposphere and stratosphere where solar radiation is at fairly high levels, an emitting electrode having a coating with a low work function, i.e. less than 4 eV, such as barium or sodium, can be used. These electrodes typically have a protective outer coating such as gold to protect against oxidation. In the presence of ultraviolet radiation with a wavelength of approximately 300 nanometers, electrons are released in large volumes from the surfaces of such low work function emitters.

Such electron emission techniques using ultraviolet radiation can also be used in combination with electric field emission techniques, such as described above, in which electrons are emitted from a metallic surface by strong electric fields present about a sharp point on the metallic surface.

Still another possible large volume source of electrons involves the use of convergent focused microwave beams to produce electrons through ionization, although such a process is still quite expensive and hence impractical.

The above-described electrode configurations are intended to be illustrative only of systems capable of producing large volumes of electrons. It is desirable of course that such systems be simple and inexpensive. When the system of FIG. 1 is located in the main troposphere region of the atmosphere, the effect of the electrons produced will be to dissociate the CFC molecules which are slowly migrating toward the stratosphere, where, as indicated above, ultraviolet radiation will release chlorine atoms from the CFCs, which in turn, through a catalytic reaction, destroy ozone molecules.

The electrons produced by the system of FIG. 1 in the main troposphere will quickly attach themselves to a majority species, such as oxygen. The oxygen atoms then will collide with CFC molecules present in the region, resulting in their prompt dissociation. The CFC molecules basically just "fall apart". The reaction is as follows: the CFC molecules ($CFCl_3$) break up upon contact with oxygen atoms into $Cl^-$ and $CFCl_2$. The $Cl^-$ particle will readily give up its negative charge to molecules or particulates with stronger electron affinity and will form compounds easily with other elements or molecules, becoming in the process bound to them. The resulting molecule will either stay in the troposphere or precipitate down to earth. The other particle, CFCl$_2$, also readily forms compounds with other elements but will not, fortunately, re-form into CFCl$_3$.

Hence, using the system of the present invention in the main troposphere, undesirable CFC molecules are dissociated into relatively safe elements. The large-scale structure shown in FIG. 1 can thus be used to remediate the existing CFC molecule condition in the main troposphere before those CFC molecules reach the stratosphere, where they will result in further damage to the ozone layer. This arrangement has the advantage of not requiring collection and disposal of the CFC molecules. It instead only requires a large surface area where negative charges are exposed to the CFC molecules.

It is desirable in some cases that the electrode array be arranged such that it can be rotated to a horizontal position during takeoff and landing of the airborne charge injection system. The arrangement of FIG. 3, involving two smaller electrode arrays than that shown in FIG. 1, is particularly suitable for such a purpose. The arrays, each supported by a pair of airships 27, 29, pivot toward each other to a horizontal position during takeoff and landing. Otherwise they are deployed in a vertical position.

In the main troposphere, conventional propeller engines 28 are used to maneuver the charge injection apparatus, with power supplied by the solar cell system. The engine 28 can be used to maintain the apparatus in a particular position as well.

The system shown in FIG. 1 is particularly suitable for use in the main troposphere region to dissociate CFC molecules, since in that region, it is only necessary to inject large quantities of electric charges into the surrounding region or provide a large negatively-charged surface, without any necessity for collection of either any resulting particulates produced from recombination of the products of dissociation or the negatively charged chlorine atoms themselves.

The charge injection structure suitable for use in the stratosphere for remediation of the ozone depletion condition is structurally similar to that shown in FIG. 1, but operates somewhat differently. The embodiment with the low work function electrode appears to be the most desirable in the stratosphere. In the stratosphere, as indicated above, CFC molecules are dissociated by ultraviolet radiation to produce chlorine atoms, which are destructive to ozone molecules. Hence, the remediation system used in the stratosphere according to the present invention injects large quantities of charges into the stratospheric region surrounding the platform to produce the desired dissociation, but also collects the negatively charged chlorine atoms, at least in one primary embodiment. In that embodiment, the positive electrode is used to collect the negatively charged chlorine atoms (or negative chlorine ions).

When electrons are produced at the emitter electrode, the chlorine atoms in the vicinity of that electrode receive the negative charge. This occurs readily because it is energetically favorable for the emitted electrons to be transferred to the chlorine atoms. Since the more abundant oxygen atoms and other atoms have lower electron affinities than the chlorine atoms (approximately 3.7 eV), the chlorine atoms will more readily acquire electrons from the emitter electrode. At a distance from the emitter electrode, chlorine atoms will acquire electrons from negatively charged oxygen atoms and molecules (or negative oxygen ions and molecules) through collisions with those atoms (or ions). The charge transfer rate, on the order of the collision rate, is very efficient.

The reactive chlorine radical Cl$^-$ lacks an electron in its outer shell and becomes a negative ion upon acquiring the electron to complete its outer electron shell. As indicated above, acquiring an electron significantly reduces the reactivity of the chlorine radical and significantly reduces its catalytic effect on ozone. The Cl$^-$ ions are then collected at the positive electrode of the system, where they give up their electron. A complete circuit is thus created between the positive and negative electrodes, so that a charge balance in the overall system is maintained.

The Cl$^-$ ion at the positive electrode will bond with sodium (Na) or other metal on the surface of the electrode, to form NaCl or other metal chlorides. The NaCl will gradually build up on the electrode, and may from time to time be vibrated off the electrode by an acoustic vibrator or similar device designed to dislodge the metal chloride. The particulate then precipitates down into the atmosphere as common salt or other compound, depending on the particular chloride. Alternatively, the metallic chloride surface material could be removed when the platform is at a lower height or on the ground.

For a spaced electrode array in which two electrodes are separated by approximately 1 meter, with a voltage of 5 kv between the two electrodes, and assuming an ion-neutral collision cross-section of 5×10$^{-16}$ cm$^2$, the mean free path $\lambda$ for an atmospheric pressure of 1 torr is $\lambda=1/n\sigma=0.2$ cm, where n is the neutral density. The drift velocity $V_d$ can be calculated as follows: $\frac{1}{2}MV_d^2=Ee_o\lambda$, such that $V_d$ is equal to 5×10$^5$ cm/s for each square meter of anode area. For a chlorine density of 10$^6$/cm$^3$, Cl$^-$ ions will be collected at a rate of 5×10$^{15}$ ions per second for each square meter of collecting area. For pressures greater than 1 torr, the voltage and area of collection must be increased.

Also present in the stratosphere are what are known as polar stratospheric clouds, which exist over the polar region, and which likely contain a large reservoir of chlorine atoms. Particulates present within these clouds can be as large as 1 micrometer in diameter, containing approximately 10$^8$ chlorine atoms. For the above-described charge generation and collection system, if used in the vicinity of such polar clouds, with a panel approximately 500 meters square, the number of chlorine atoms collected per panel is 7.5×10$^{22}$ atoms per second. This assumes a relative velocity of 30 meters per second between the gas and the platform.

Using a number of platforms, such as on the order of ten, the chlorine concentration in such regions can be significantly remediated within a few years. Since the polar stratospheric clouds are readily locatable by temperature and humidity profiles through the use of computer-based atmospheric circulation models, and since such clouds likely contain a significant percentage of the total chlorine atoms in the stratosphere, the above-described platforms can be advantageously positioned in such regions.

Because of the particulate nature of chlorine in polar stratospheric clouds, the resulting negatively charged particulate can be either collected at the positive electrode of the system electrode array, or the particulates will join or coagulate with other compounds to the extent that they precipitate out of the stratosphere to the earth's surface when they grow to a sufficiently large size. In that case, a collection electrode is not necessary.

An alternative embodiment for primary use in the stratosphere is shown in FIG. 4. FIG. 4 includes a plurality of helium airships 42 for flotation, and a wire cage electrode array, shown generally at 44. The wire cage is designed to provide both positive and negative electrodes within a lightweight structure. An RF field is used to produce an electron ion "plasma" within the cage 44, which in one embodiment is 500 meters long by 200 meters wide. These dimensions can vary considerably, depending on the RF excitation frequency. One surface, e.g. surface 45, of the cage 44 is biased positively by a DC voltage, with that surface thus acting as a positive electrode for the Cl⁻ ions produced within the cage as the apparatus sweeps through a particular region. One advantage of this arrangement is that the electric field extends over a large region of space, i.e. the volume defined by the wires of the cage.

Figure 6:
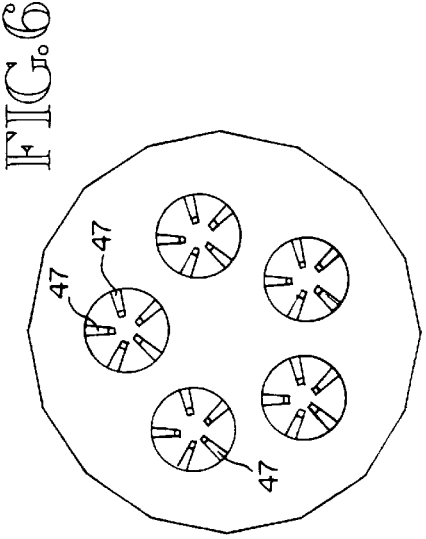
FIG. 6 is a cross-sectional diagram of the ion engine of FIG. 5.
Figure 5:
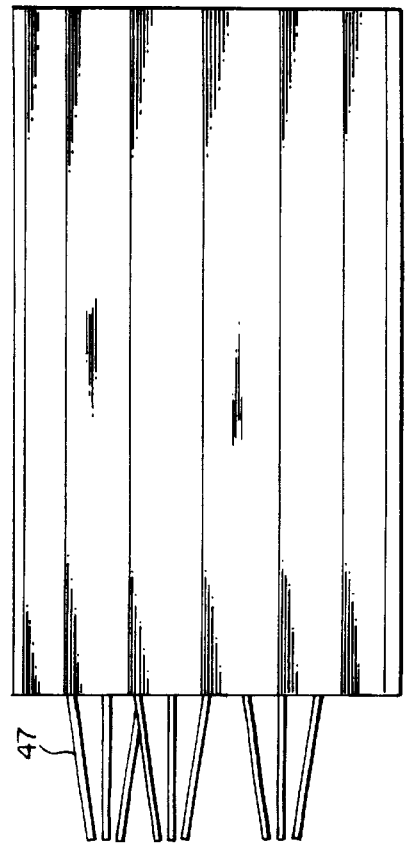
FIG. 5 is a side elevational view of an ion engine for use with an embodiment of the system of the present invention.

As discussed above, the means for propulsion for such platforms in the troposphere is by propeller. In the stratosphere, however, with its thin atmosphere, propellers are inefficient, and hence, ion engines are used on the helium airships when they are deployed in the stratosphere. The ion engine is solar powered and uses the surrounding atmosphere as a source of gas. The ion engine, shown in FIGS. 5 and 6, includes emitter electrode assemblies 47—47, each of which comprise a plurality of pointed electrodes. The electrodes are biased at a negative voltage of at least −3 kv to eject, by means of field emission, energetic electrons, forming a plasma of electrons and positive ions.

The positive ions, which are heavier than the electrons by a factor of 30,000, are attracted to and hence accelerate toward the negative electrodes, imparting a momentum to the electrodes. This imparted momentum is equal to the ion mass times their acceleration velocity. The total amount of momentum which is imparted to the ion engine structure is equal to the total flux of ions, which is equal to the ion density times velocity, times the momentum of each ion.

The atmospheric drag on the platform system in the stratosphere is sufficiently low, because of the low atmospheric pressure, that the momentum produced by ions is sufficient to counter the drag force so as to maintain the platform stationary or even move it against the atmospheric wind. It can be demonstrated that the drag force $F_{drag}=C_d(\frac{1}{2}\rho_o v_o^2)A_o$ (where $\rho_o$=neutral density, $v_o$=the neutral flow velocity, $A_o$=surface of the platform, $c_d$=drag coefficient= 0.015) is balanced by the momentum flow imparted by the ion engine $F_{ion}=\rho_i v_i^2 A_i$ where $\rho_i$ is the ion density, $v_i$=accelerated ion velocity, and $A_i$=area of the ion engine. Thus, the above-described platforms operated at high altitudes in the stratosphere, navigated by ion engines, can be more easily maintained in a stationary position in the thin atmosphere, because of the lower total drag force. The light weight ion engine described above, without significant moving parts, is ideal for such high altitude operations, using solar power as the primary source of energy.

For the efficient capture and processing of atmospheric pollutants, it is sufficient for the platform apparatus to have a velocity equal to and opposite to the atmospheric wind. It is also convenient, for control purposes, to have a platform which is stationary relative to the location of a ground controller. A platform which is maintained in place/ propelled by ion engines at stratospheric heights is also useful for telecommunication and scientific experiments which require that interference from the atmosphere in astronomical observations be at a minimum. Laser communication can be maintained between adjacent platforms along extensive line of sight paths (even around the entire earth) because of the low ambient atmospheric pressure.

Furthermore, a network of stationary platforms, as shown in FIG. 11, can provide regional or global telecommunications capability. The earth, shown at 50 in FIG. 11, is encircled with a series of platforms 52—52, similar to a geodesic dome arrangement. The individual platforms, positioned at stratospheric heights, will be navigated by ion engines. The platforms will communicate with each other by high frequency electromagnetic waves and by lasers (up to the UV wavelength range), which allow the greatest bandwidth for communications. Lasers are not efficient or in some cases even possible at lower atmospheric heights because the atmosphere interferes with signal propagation by absorption effects. This high altitude network with lasers does offer an alternative to the expensive ground-based network of fiber optics or microwave systems.

As an alternative to the collection of the Cl⁻ ions in the stratosphere, and/or the precipitation of particulates, it is also possible to expel Cl⁻ ions or other polluting ions out of the stratosphere. The Cl⁻ ions have a specific known mass and hence a natural resonant frequency, known as the ion cyclotron frequency, which is proportional to the earth's magnetic field and inversely proportional to the ion mass. The ion cyclotron frequency will vary depending on the ion to be expelled. A high frequency electromagnetic wave in the frequency range of approximately 2–10 MHz, commonly called the HF range, may be generated on earth and transmitted upwardly to about 75–100 KM where there is a natural current called the electrojet. The transmitted HF wave modulates this electrojet current at a low frequency, selected to be equal to the ion cyclotron frequency of the particle to be expelled.

The electric field of this low frequency wave accelerates this particular ion species which have been pulled up to the 125–150 KM height by a combination of the fair weather electric field, convection, diffusion or other artificially created field. This is a resonant process and the electric field of the wave can efficiently accelerate negative Cl ions or other ions to a velocity sufficient to overcome the earth's gravitational field. This acceleration process imparts an energy gain of 23 ev in approximately 10 seconds. The ions are then accelerated upward to deep space.

Figure 7:
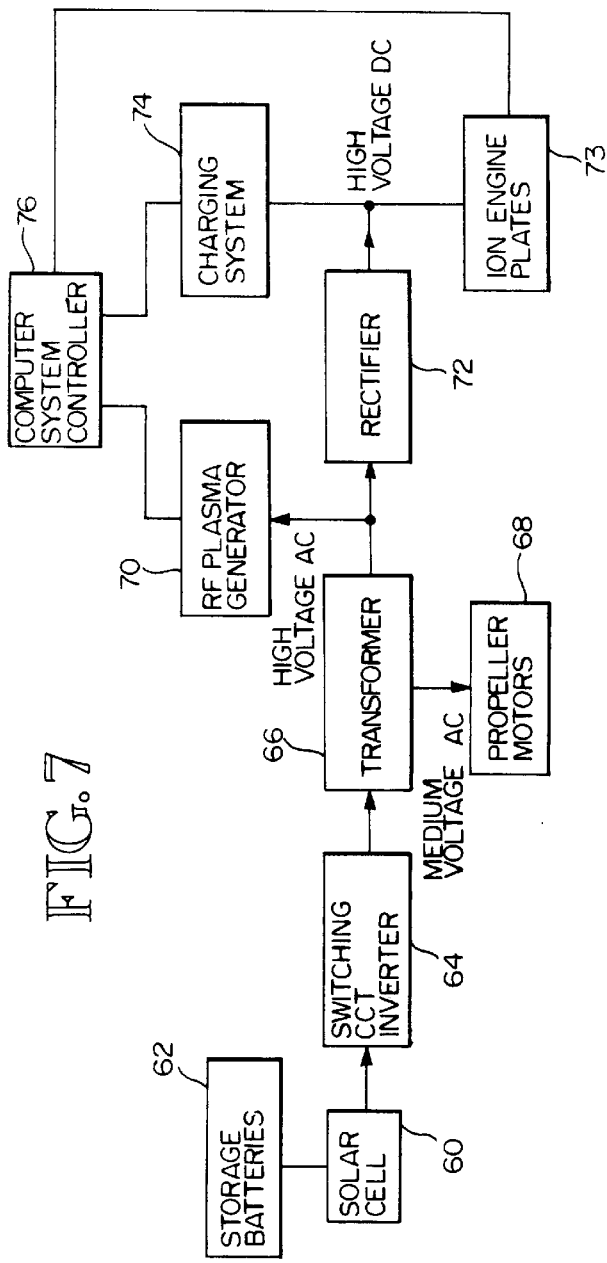
FIG. 7 is a block diagram showing the structural and functional operation of an embodiment of the system of the present invention.

A functional block diagram of the operation of the system of the present invention is shown in FIG. 7. The bank of solar cells 60 provide electric power (DC) for the system. The power may be temporarily stored by storage batteries 62. The DC power from the solar cells 60 is changed to AC by an inverter 64. A transformer 66 converts the AC power to the desired voltage levels which are used to drive propeller motors 68 and an RF plasma generator 70 (if needed). The AC voltage is then rectified at 72 to drive an ion engine 73 (if needed) and a charging system 74. A computer controller 76 controls the operation of the system.

Figure 8:
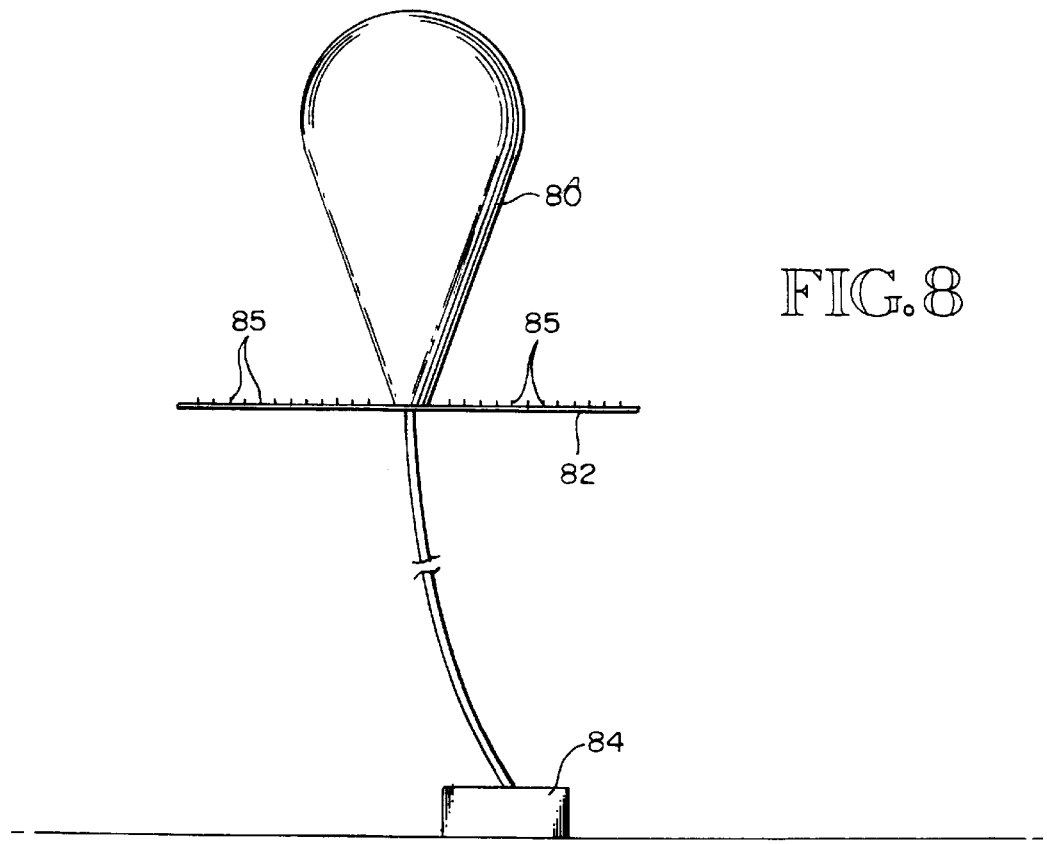
FIG. 8 is a schematic view of an embodiment of the system of the present invention particularly adapted for use with pollutants in the lower troposphere.

The present invention is also useful in the lower troposphere region of the atmosphere to remediate particulate and aerosol pollution, primarily smog. As indicated above, temperature inversions often create a "trapped" layer of smog which in turn captures other pollutants. The temperature inversion prevents normal venting of the smog into the upper atmosphere. The system of the present invention, in the embodiment shown in FIG. 8, can be used to remediate this condition. The system of FIG. 8 includes a tethered metallic balloon 80, at the base of which is a surface 82 which opens up and away from the balloon once it is in position. Surface 82 includes a number of sharp emitter electrode points 85 which produce electrons by the ultraviolet radiation emission effect described above and/or by an RF field. A power supply 84 is positioned on the ground and the leads extend up along the tether to the balloon 80.

Figure 10:
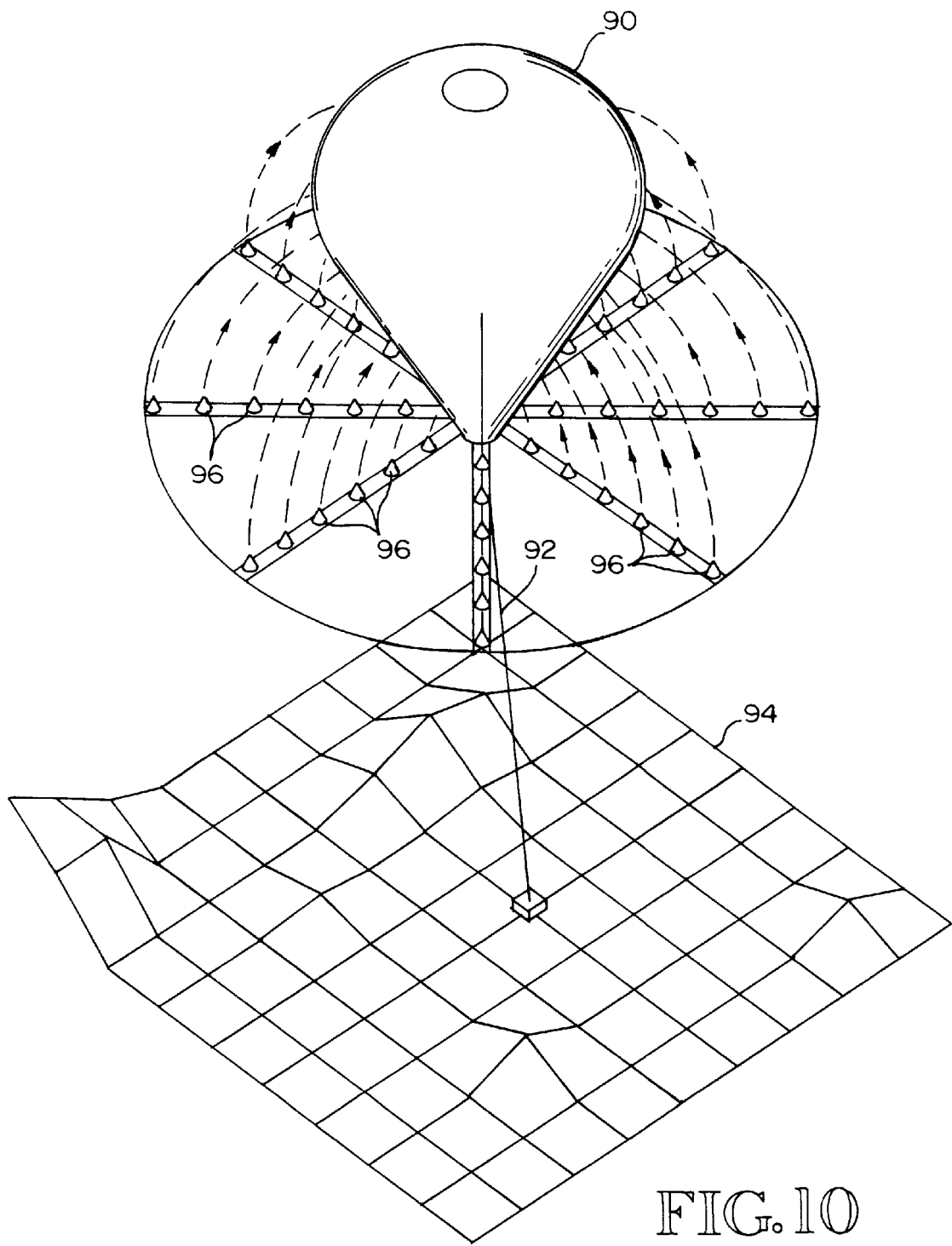
FIG. 10 is a schematic view of an embodiment similar to that of FIG. 8, but in more detail.

Hence, as with the embodiments described above for use in the main troposphere and the stratosphere to remediate ozone depletion, large-scale injection of negative charges occurs in the region around the balloon, in the lower troposphere. Alternative embodiments include an airplane-based system, a kite, or one of the helium airship air flotation embodiments previously described. In operation, the negative charges produced by the emitter electrodes become bonded to the polluting particulates and can be attracted to a positive electrode on the balloon surface, where the negative charge particulate gives up its electron, so that a complete circuit is formed. This reduces the amount of pollutants in the region of the balloon. This is illustrated in FIG. 10, which shows a balloon 90, held by a tether 92 to the ground 94 and a plurality of emitter electrodes 96—96, from which charges move to polluting particulates and then to the surface of the balloon.

A potentially greater effect can be achieved, with or without a collector electrode, if the balloon platform or other charge device is used in a particular way. The charged particulates produced by operation of the present invention, having the same charge sign, will repel each other, and will accordingly produce in due time a thinning of the smog layer where the device is located. Ultimately a break or "hole" in the smog layer to the upper atmosphere is created by continuous operation of the device in a given location.

Figure 9:
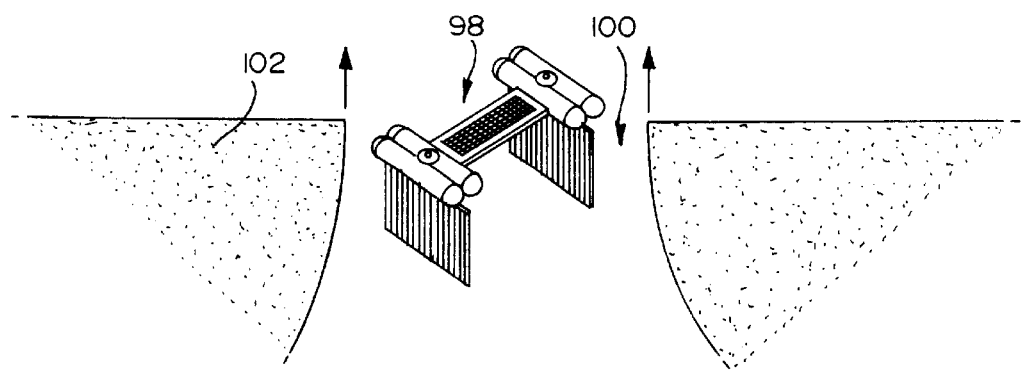
FIG. 9 is a schematic view showing the use of an embodiment of the present invention in the lower troposphere.

This is illustrated in FIG. 9, which shows a platform device 98. The "hole" 100 in the smog layer 102 illustrated in FIG. 9 has the significant benefit of acting as a vent or a chimney for the movement of pollutants in the smog layer to a greater height. The temperature inversion condition will have a positive effect in the situation as the trapped smog will move quickly, driven by thermal pressure, like smoke through a chimney with a good draft, through the hole, dispersing the smog.

Hence, a system has been described for remediating pollution conditions in various regions of the atmosphere. In each case, a large volume of negative charges is injected into the region surrounding the positioned system. In some cases, depending upon the particular region and the type of pollution, the particles or atoms which receive the negative charges are collected by a positive electrode. In other cases, the negatively charged particulates are dispersed. In some cases the particulates collect or coagulate sufficiently to precipitate down to the earth. One of the benefits of the present invention is the capability of remediating chlorofluorocarbon atoms in the main troposphere region which are migrating to the stratosphere, where they could destroy ozone atoms. Another important benefit is the capability of creating a vent-like opening in a smog layer in the lower troposphere, such that the smog, driven by thermal pressure, moves quickly through the vent to the upper atmosphere. The present invention can be made in extremely large sizes, particularly for the main troposphere and stratosphere applications, and therefore can be effective for practical large-scale operations.

Further, the stratospheric height of the platform offers several advantages in different situations. For instance, it allows in situ observation of the critical region of the earth's atmosphere containing the ozone layer. It also provides a large spatial capability for telecommunications as well as global remediation.

Although a preferred embodiment of the invention has been described, it should be understood that various changes, modifications and substitutions may be made without departing from the spirit of the invention, which is defined by the claims which follow.

What is claimed is:

1. A method for remediation of atmospheric conditions in the main troposphere, 2–12 KM above the earth's surface, comprising the steps of:

producing electrons by an emitting means; and positioning and propelling said emitting means in a selected region of the main troposphere, such that said electrons produced by the emitting means are present in a volume about said emitting means, wherein said volume includes an atmospheric condition characterized by the presence of chlorofluorocarbon molecules, wherein the presence of said electrons in said volume results in the dissociation of said chlorofluorocarbon molecules so that the chlorofluorocarbon molecules do not reach the stratosphere, and wherein chlorine ions produced as a result of the dissociation of the chlorofluorocarbon molecules combine with other atmospheric elements present in the vicinity of the emitting means.

2. A method for remediation of atmospheric conditions in the stratosphere, 12–50 KM above the earth's surface, comprising the steps of:

producing electrons by an emitting means; and positioning and propelling said emitting means in a selected region of the stratosphere, such that said electrons produced by the emitting means are present in a volume about said emitting means, wherein said volume includes an atmospheric condition characterized by the presence of chlorine atoms, wherein said electrons attach themselves to the chlorine atoms to produce negatively charged chlorine ions, thereby reducing the reactivity of said chlorine atoms and in turn reducing the destruction of ozone in the stratosphere by chlorine atoms.

3. A method for remediation of atmospheric conditions in the lower troposphere, 0–2 KM above the earth's surface, comprising a layer of smog, comprising the steps of:

producing electrons by an emitting means; and positioning said emitting means in the vicinity of said layer of smog, such that said electrons produced by the emitting means are present in a volume about said emitting means, wherein said electrons attach themselves to smog elements which comprise the layer of smog, creating a sufficiently negative charge on the smog elements that they repel each other in the said volume, thereby creating an opening in the layer of smog to the main troposphere, wherein a substantial amount of the remaining smog moves through the opening into the main troposphere, resulting in remediation of the smog condition.

4. A system for remediation of atmospheric conditions in the main troposphere, 2–12 KM above the earth's surface, comprising:

a producing means comprising an electron emitting electrode for releasing negative charges into the troposphere, including an electrode which has a sufficiently low work function such that the impinging of ultraviolet light on the electrode results in electrons being released therefrom;

an airborne means for positioning said producing means in a selected region of the main troposphere, 2–12 KM above the earth's surface, and for propelling said producing means so that said electrons produced by the producing means are present in a volume about said producing means, wherein said volume includes an atmospheric condition characterized by the presence of polluting molecules, wherein the presence of said electrons in said volume results in the dissociation of said polluting molecules so that the polluting molecules do not reach the stratosphere and wherein products produced as a result of the dissociation of the polluting molecules combine with other atmospheric elements present in the vicinity of the positioning means.

5. The system of claim 4, wherein the electrode is biased at a voltage sufficiently negative to emit electrons or negative charges, such as negative oxygen molecules, when air or oxygen molecular gas passes through a negatively biased electrode.

6. The system of claim 5, wherein the emitting electrode is an elongated section of wire and the collection electrode is in the form of a screen surrounding the wire and wherein the producing means includes a plurality of said emitter electrode and collection electrode combinations, connected together as an array, which includes a planar array.

7. The system of claim 4, wherein the producing means includes an emitting electrode and a collection electrode and means for creating an electric field between them so that the emitting electrode produces a volume of electrons.

8. The system of claim 4, wherein the producing means includes a cage assembly and an electric field means for producing a plasma within the volume of the cage, wherein one area of the cage surface is biased so as to collect chlorine atoms, each having a negative charge.

9. The system of claim 4, wherein the producing means includes a cage assembly and an oscillating electric field means for producing a plasma within the volume of the cage, wherein one area of the cage surface is biased so as to collect chlorine atoms having a negative charge.

10. The system of claim 4, wherein the airborne means is an assembly propelled by engines which are capable of operating in the troposphere, where the atmospheric pressure is lower than that at the earth's surface.

11. The system of claim 10, wherein the assembly consists of a lighter-than-air airship filled with either helium or hydrogen.

12. The system of claim 10, wherein the engine is an ion engine, comprising:
  electrodes; and
  means for biasing each electrode to maintain each electrode at a selected electric potential, and for producing a plasma of positive and negative charges in the vicinity of each electrode, the plasma comprising negative and positive ions, wherein the negative charges are repelled by the negative electrode, imparting a force to the electrode and the assembly, which is sufficient to overcome the atmospheric drag in the troposphere so as to move the assembly in a controlled manner, while similarly, positive charges are repelled by the positive electrode to produce a similar propelling force.

13. The system of claim 12, wherein the negative charges emitted by the ion engine dissociate the polluting molecules.

14. The system of claim 10, including a propeller driven means for moving the system through the main troposphere.

15. The system of claim 4, wherein the positioning means includes a lighter-than-air assembly to which is secured the emitting electrode for producing the negative electric charges.

16. The system of claim 4, including solar cell means for supplying power to the system.

17. The system of claim 4, including means for collecting the negatively charged atmospheric elements.

18. The system of claim 4, wherein said positioning means includes a tethered balloon, and wherein said producing means includes electrode means in the vicinity of the balloon for emitting electrons and an electric power circuit for said system located on the ground.

19. The system of claim 4, wherein the positioning means includes a tethered kite, and wherein said producing means includes means in the vicinity of the kite for emitting electrons and an electric power circuit for said system located on the ground.

20. A system for remediation of atmospheric conditions in the stratosphere, 12–50 KM above the earth's surface, comprising:
  a producing means comprising an electron emitting electrode for releasing negative charges into the stratosphere, including an electrode which has a sufficiently low work function such that the impinging of ultraviolet light on the electrode results in electrons being released therefrom;
  an airborne means for positioning said producing means in a selected region of the stratosphere 12–50 KM and for propelling said producing means so that said electrons produced by the producing means are present in a volume about said producing means, wherein said volume includes an atmospheric condition characterized by the presence of chlorine atoms, wherein said electrons attach themselves to the chlorine atoms to produce negatively charged chlorine ions, thereby reducing the reactivity of said chlorine atoms and in turn reducing the destruction of ozone in the stratosphere by chlorine atoms.

21. The system of claim 20, wherein the producing means includes an emitting electrode and a collection electrode and means for creating an electric field between them so that the emitting electrode produces a volume of electrons.

22. The system of claim 21, wherein the collecting electrode collects chlorine atoms to each of which a negative electron has become attached.

23. The system of claim 21, wherein the emitting electrode is an elongated section of wire and the collection electrode is in the form of a screen surrounding the wire and wherein the producing means includes a plurality of said emitter electrode and collection electrode combinations, connected together as an array, which includes a planar array.

24. The system of claim 20, wherein the producing means includes a cage assembly and an electric field means for producing a plasma within the volume of the cage, wherein one area of the cage surface is biased so as to collect chlorine atoms, each having a negative charge.

25. The system of claim 20, wherein the airborne means further comprises an ion engine consisting of emitters which emit charges and this engine is capable of operating in the stratosphere, wherein the selected region is the polar region of the stratosphere, in the vicinity of polar clouds which include particulate containing a large number of chlorine atoms, wherein the electrons become attached to said particulate in the polar clouds, with the negatively charged chlorine-containing particulate falling to earth, when said particulate accumulate to a sufficient size.

26. The system of claim 20, including an ion propulsion means for moving the system through the stratosphere.

27. The system of claim 20, wherein the engine is an ion engine, comprising:
  electrodes; and
  means for biasing each electrode to maintain each electrode at a selected electric potential, and for producing a plasma of positive and negative charges in the vicinity of each electrode, the plasma comprising negative and positive ions, wherein the negative charges are repelled by the negative electrode, imparting a force to the electrode and the assembly, which is sufficient to overcome the atmospheric drag in the troposphere so as to move the assembly in a controlled manner, while similarly, positive charges are repelled by the positive electrode to produce a similar propelling force.

28. The system of claim 20, including a propeller propulsion means for moving the system through the stratosphere.

29. The system of claim 20, wherein the selected region of space is the stratosphere, and wherein the atmospheric condition is polluting ions, the system including electric field means for accelerating the polluting ions beyond the stratosphere.

30. The system of claim 29, wherein said electric field means includes means for generating an RF wave which modulates a naturally occurring current in a region of space beyond the stratosphere, said modulation creating an electric wave which acts on the polluting ions to accelerate the polluting ions.

31. The system of claim 29, wherein the polluting ions are chlorine ions, wherein the RF generating means is located on earth, and wherein the frequency of the RF wave is matched to the natural resonant frequency, the ion cyclotron frequency, of the chlorine ions.

32. A system for remediation of atmospheric conditions in the lower troposphere, 0–2 KM above the earth's surface, comprising:

a producing means comprising an electron emitting electrode for releasing negative charges into the lower troposphere, including an electrode which has a sufficiently low work function such that the impinging of ultraviolet light on the electrode results in electrons being released therefrom; and an airborne means for positioning said producing means in the lower troposphere, so that said electrons are present in a volume about said producing means, wherein said volume includes an atmospheric condition characterized by a layer of smog comprising polluting atmospheric elements, wherein said electrons or negative charges attach themselves to the polluting atmospheric elements such that resulting negatively-charged atmospheric elements repel each other throughout said volume, thereby creating an opening in the smog layer to the main troposphere, wherein a substantial amount of the remaining smog moves through the opening into the main troposphere, resulting in remediation of the smog condition.

33. The system of claim 32, including means of collecting the negatively charged atmospheric elements.

34. The system of claim 32, including means for collecting the negatively charged atmospheric elements as particulate.

35. The system of claim 32, wherein said positioning means includes a tethered balloon, and wherein said producing means includes electrode means in the vicinity of the balloon for emitting electrons and an electric power circuit for said system located on the ground.

36. The system of claim 32, wherein the positioning means includes a tethered kite, and wherein said producing means includes means in the vicinity of the kite for emitting electrons and an electric power circuit for said system located on the ground.

* * * * *